Feb. 5, 1924.  
J. M. CALLEJAS  
HYDRAULIC MOTOR  
Filed Oct. 23, 1919  
1,482,545  
6 Sheets-Sheet 3
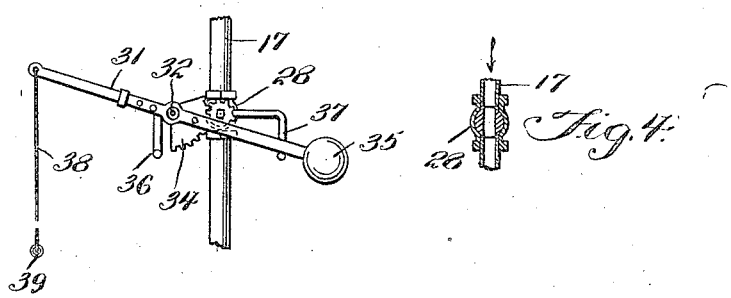
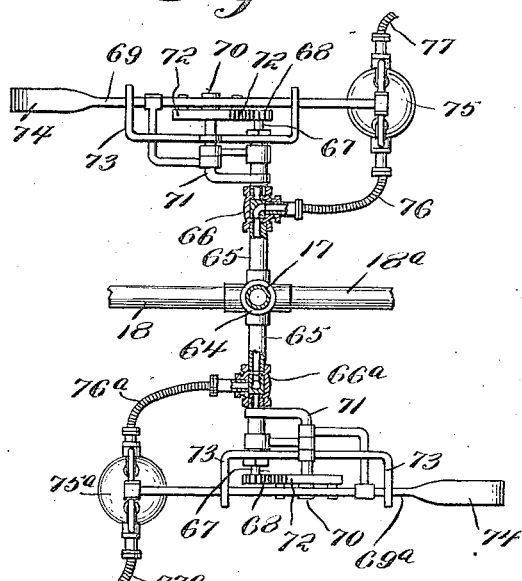
Inventor  
Jose Ma Callejas  
By B. Singer  
Attorney

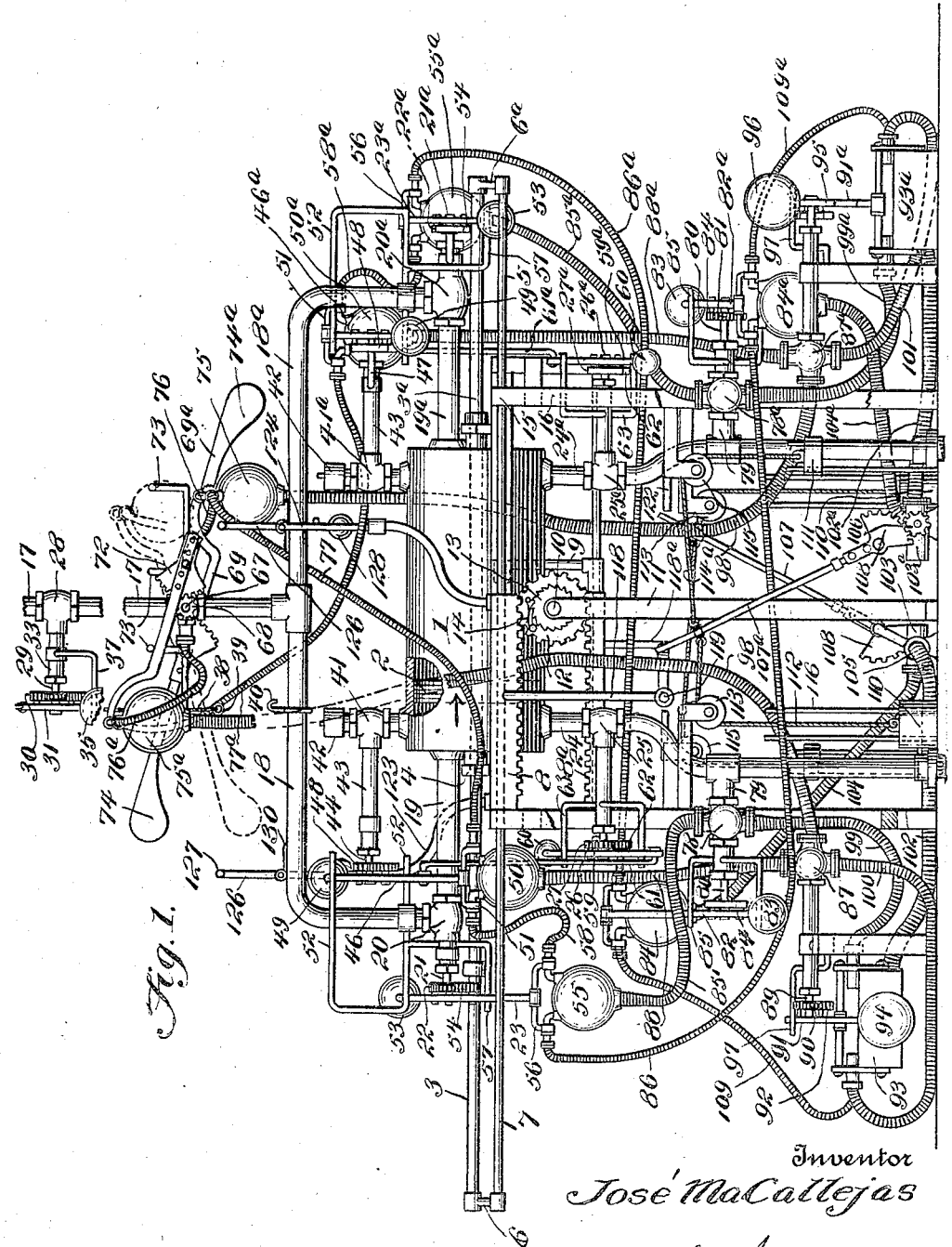

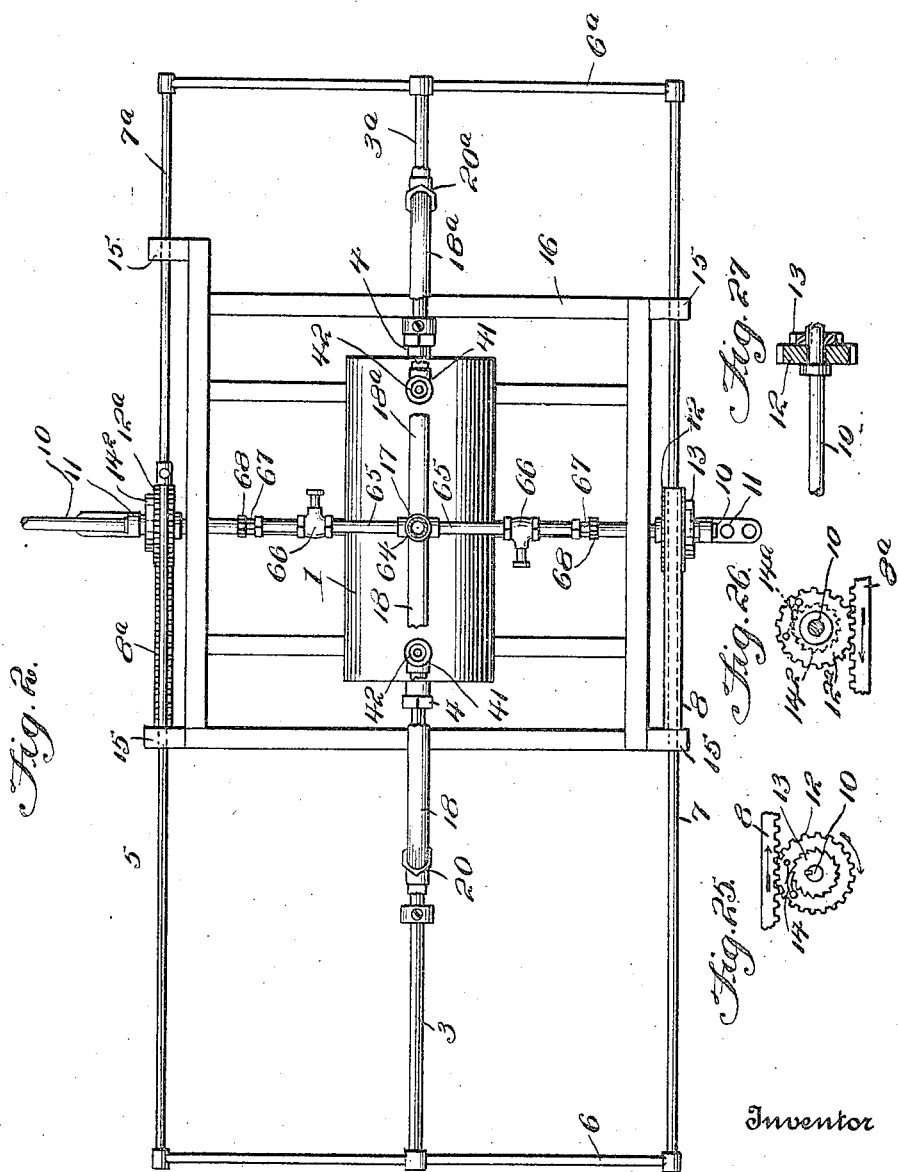

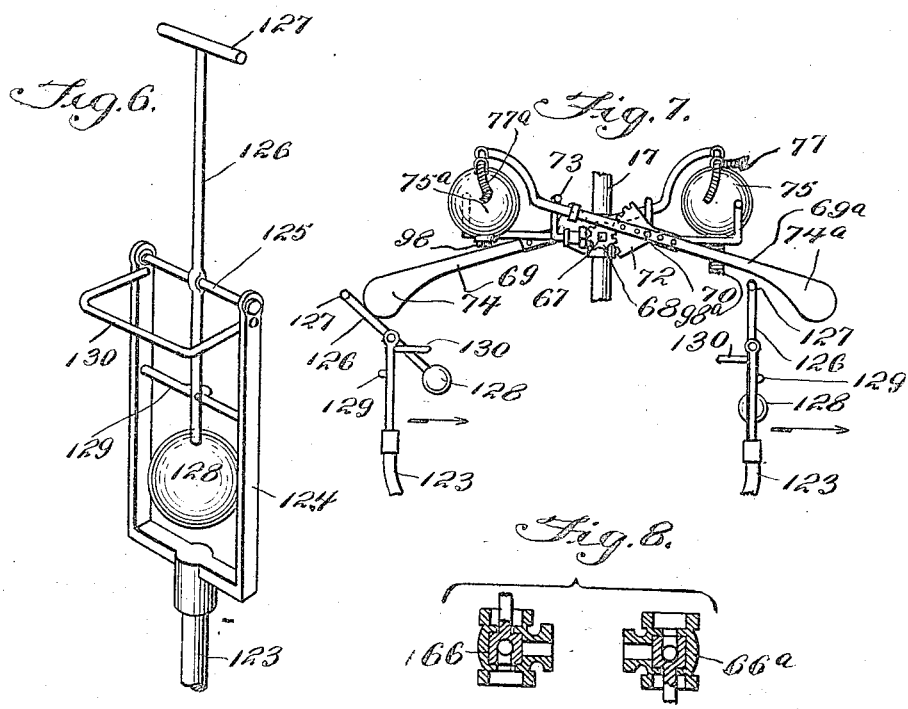

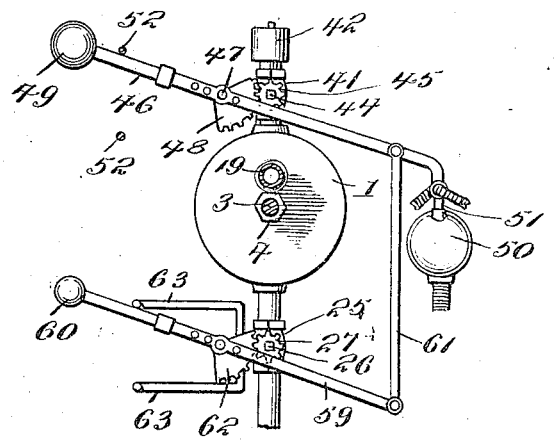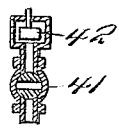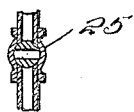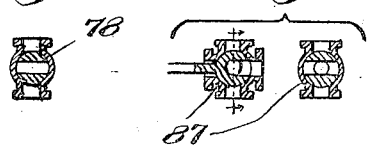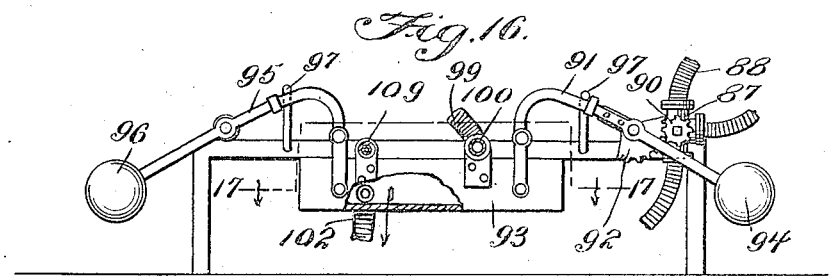

Feb. 5, 1924.
J. M. CALLEJAS
1,482,545
HYDRAULIC MOTOR
Filed Oct. 23, 1919.
6 Sheets-Sheet 6
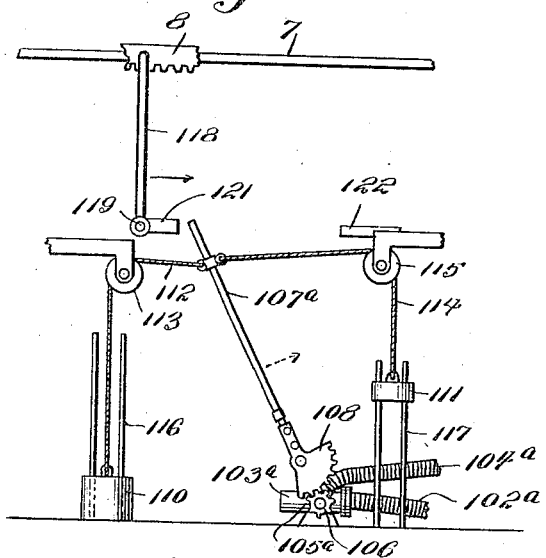
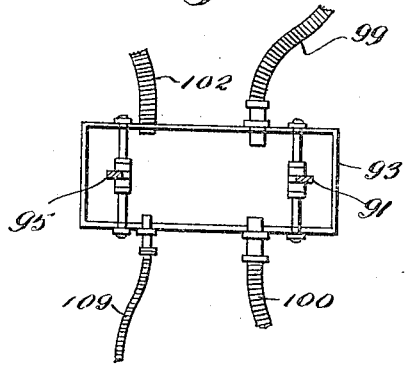
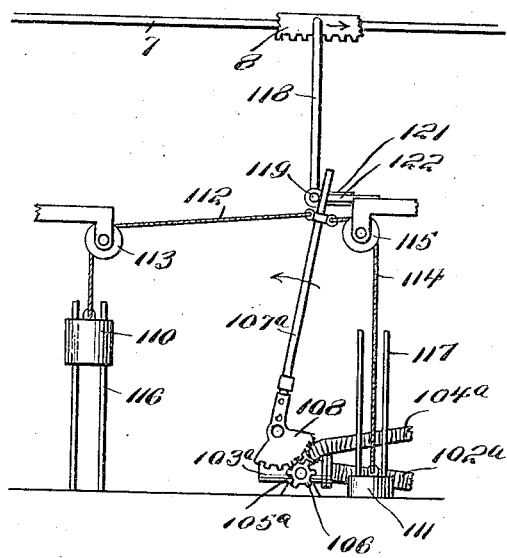
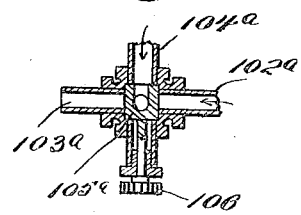
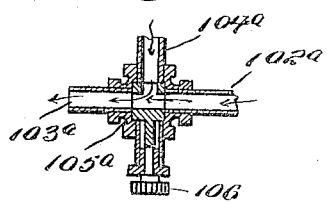
Inventor
José Ma Callejas
By
B. Singh
Attorney Patented Feb. 5, 1924.

1,482,545

UNITED STATES PATENT OFFICE.

JOSÉ MA. CALLEJAS, OF HABANA, CUBA.

HYDRAULIC MOTOR.

Application filed October 23, 1919. Serial No. 332,780.

*To all whom it may concern:*

Be it known that I, JOSÉ MARIA CALLEJAS, a citizen of Cuba, residing at #215 C Street, Habana, Cuba, have invented new and useful Improvements in Hydraulic Motors, of which the following is a specification.

This invention is an improved hydraulic motor which may be operated by water from a reservoir, aqueduct, or other elevated source, or by any other suitable motor fluid under pressure, the object of the invention being to provide an improved motor of this kind in which the power produced in the Pascal experiment known by the name of "barrels bursting" is utilized to cause a piston to reciprocate in a cylinder and to impart rotary movement to a power shaft or other suitable power transmitting element.

With the above and other objects in view, the invention consists in the construction, combination and arrangement of devices hereinafter described and claimed.

In the accompanying drawings:—

Fig. 1 is an elevation, partly in section, of a hydraulic motor constructed and arranged in accordance with one embodiment of my invention.

Fig. 2 is a detail plan of the same, partly in section, showing the construction of the frame which reciprocates with the cylinder and associated parts.

Fig. 3 is a detail elevation of the starting lever and the gears which operate the starting or controlling valve.

Fig. 4 is a detail vertical sectional view of the starting or controlling valve, showing the same open.

Fig. 5 is a detail plan, partly in section, of the primary valves 66, 66ª, and their associated levers, gears, and water weight vessels.

Fig. 6 is a detail perspective view of one of the tappets and associated devices which are caused by the movement of the piston to impart the required initial movement to the primary levers.

Fig. 7 is a detail elevation of the primary levers 69, 69ª, their associated devices and the tappets which impart the required initial movement to said levers.

Fig. 8 is a sectional view of the valves 66, 66ª, showing such valves in positions corresponding to those of the levers 69, 69ª, in Fig. 7.

Fig. 9 is an elevation similar to Fig. 7, and showing the levers and tappets in another position.

Fig. 10 is a detail sectional view of the valve 66ª, showing such valve in open position and corresponding to the position of the levers in Fig. 9.

Fig. 11 is a detail elevation of the levers 47, 59, and their connections.

Fig. 12 is a detail sectional view of the air outlet valve 41.

Fig. 13 is a similar view of the water outlet valve 25, showing the same in closed position.

Fig. 14 is a similar view of the valve 78, showing the same in closed position.

Fig. 15 is a sectional view of the valve 87 showing the same in two positions.

Fig. 16 is a detail elevation, partly in section, of the water weight tank 93 and its associated levers and counter-balancing weights and gears which operate the valve 87.

Fig. 17 is a detail plan of the same.

Fig. 18 is a detail elevation of the lever 107ª and its operating mechanism.

Fig. 19 is a similar view of the same, showing said lever in a different position from that shown in Fig. 18.

Fig. 20 is a detail sectional view of the valve 105ª, showing the same in closed position.

Fig. 21 is a similar view of the same, in open position.

Fig. 22 is a detail plan of the cam 122, the lever 107ª, the tappet bar 119, the detent arm 121, the spring 120, and shows the hanger 118 in cross section.

Fig. 23 is a similar view of the same, showing the tappet arm in disengaged position, to release the lever 107ª.

Fig. 24 is a detail elevation showing the lever 107ª when engaged behind the tappet 119, in full lines, and in the act of being disengaged from and being passed over by said tappet, in dotted lines, and showing the direction of movement of said lever under such condition.

Fig. 25 is a detail elevation of the rack bar 8 and the pawl and ratchet mechanism associated therewith which imparts step-by-step rotation to the power shaft 10.

Fig. 26 is a similar view of the rack bar 8ª and its corresponding pawl and ratchet mechanism for the same purpose.

Fig. 27 is a detail elevation, partly in section, of the power shaft and pawl and ratchet mechanism shown in Fig. 25.

A cylinder 1, which is here shown as arranged horizontally, is provided with a piston 2 which has piston rods 3, 3ª, extending in opposite directions therefrom and which pass through stuffing boxes 4 with which the cylinder heads are provided. A frame 5 comprises cross bars 6, 6ª which are respectively attached to the outer ends of the piston rods, and side rods 7, 7ª which connect the outer ends of said cross bars, said rod 7 having a rack bar 8 at a point intermediate its ends and said rod 7ª having a rack bar 8ª, said rack bar 8ª being arranged below the said rod 7ª and being connected thereto by hangers 9. A power shaft 10 is arranged at right angles to the cylinder 1 and passes below the central portion thereof and is mounted for rotation in bearings with which suitable standards 11 are provided. Said shaft has a loose gear wheel 12 which engages the rack 8 and a similar gear wheel 12ª which engages the rack 8ª, said racks being on opposite sides of said gear wheels respectively. Said shafts also have a ratchet wheel 13 which is keyed thereto and is associated with the gear 12 and is further provided with a ratchet wheel 14², which is also keyed and is associated with the gear 12ª. Said gears are respectively provided with spring pressed pawls 14, 14ª, and said ratchet wheels and pawls are arranged in reverse relation, as shown in Figs. 26 and 27. The frame 5 participates in the reciprocating movement of the pistons, as will be understood. The rods 7, 7ª, operate in slide bearings 15 with which a suitable supporting frame 16 is provided.

The feed pipe 17 for water or other motor fluid under pressure leads downwardly from a suitable reservoir, aqueduct, or other source, and is connected to the opposite ends of the cylinder by branch pipes 18, 18ª, and pipes 19, 19ª, which are respectively connected to said branch pipes through the casing of inlet valves 20, 20ª, the said valves being of suitable construction and being respectively provided with operating shafts 21, 21ª, said shafts being respectively provided with gears 22, 22ª, at their outer ends, and also with levers 23, 23ª, respectively. Discharge pipes 24, 24ª lead downwardly from the ends of the cylinder. Discharge valves 25, 25ª, have their casings respectively connected to the pipes 24, 24ª, and said valves are respectively provided with shafts 26, 26ª, which shafts are respectively provided with gears 27, 27ª, at their outer ends.

A controlling valve 28, to start or stop the motor, has its casing connected to the pipe 17 and said valve is provided with a shaft 29, which has a gear 30 at its outer end. A controlling lever 31 is pivotally mounted as at 32 on a suitable support which extends from the tube 33 which forms the bearing for the shaft 29, and said lever has a sector gear 34 which engages the gear 30. At one end of said lever is a weight 35 which serves to normally hold said lever in the position indicated in Figs. 1 and 3, to cause the gears 34, 30, to hold the valve 28 in open position as shown in Fig. 4 and cause the motor to operate. Stop arms 36, 37, extend from opposite sides of the tube 33, said arm 37 limiting the movement of the lever in one direction by the weight 35 and the arm 36 limiting the movement of the lever in the reverse direction, when the valve 28 is turned to closed position. A cord 38 is here shown attached to the opposite end of the lever from the weight 35 and is provided at the lower end with a ring or link 39 which may be engaged with a hook 40 to hold the lever in the required position to keep the valve 28 closed, when it is desired that the motor shall not operate.

The cylinder 1 is also provided, at the ends, on the upper side, with air outlet valves 41, 41ª, to afford vent and hence enable the cylinder to be rapidly filled with water from opposite ends as is required in the operation of the motor. Casings of said air outlet valves are provided with float valves 42, to prevent the escape of water, and are also provided with tubes 43. Each of said valves also has a shaft 44 which has a bearing in and extends through said tubes and is provided at the outer end with a gear 45. A lever 46 is associated with the valve 41 to turn the same, and a similar lever 46ª is associated with the valve 41ª. Each of said levers is fulcrumed as at 47 on a support which extends from the tube 43, and each lever also has a sector gear 48 which engages the gear 45. At one end of each of said levers is a weight 49. Said levers are respectively provided at the opposite end with water weight vessels 50, 50ª, which are here shown as spherical and as hung from said levers by means of hangers 51 which are pivoted to said levers. Stops 52 are provided to limit the extent of movement of said levers in either direction, said stops being here shown as connected to and supported by the pipes 18, 18ª. Each of the levers 23, 23ª hereinbefore mentioned is provided at one end with a weight 53 and with a sector gear 54 which engages the associated gear 22. Said levers are respectively provided at the opposite ends with water weight vessels 55, 55ª, which are swung therefrom by hangers 56. Stops 57 are provided to limit the extent of movement of said levers 23, 23ª. The vessels 50, 55, are connected together by a flexible hose 58. A similar hose 58ª connects the vessels 50ª, 55ª.

The discharge valves 25, 25ª are respectively operated by levers 59, 59ª, each of which is provided at one end with a weight 60. The opposite end of the lever 59 is connected by a link rod 61 to the lever 46, for movement therewith. A corresponding link rod 61ª connects the levers 46ª, 59ª. Each lever 59, 59ª, has a sector gear 62 which engages the associated valve gear 27. The extent of movement of the levers 59, 59ª, is controlled by stops 63. The feed pipe 17 includes a union 64 from which project two oppositely extending branch pipes 65 in one of which is a valve 66, the other branch pipe being provided with a valve 66ª. Each of the said valves has a stem 67 which is provided at the outer end with a gear 68. A rocking lever 69 is associated with the valve 66 and a rocking lever 69ª is associated with the valve 66ª. Said levers are fulcrumed as at 70 on supporting brackets 71 with which the branch pipes 65 are provided and each lever has a sector gear 72 which engages the associated gear 68. Stops 73 are also provided which limit the extent of movement of the said levers. The lever 69 is provided at one end with a cam 74, lever 69ª having a similar cam 74ª. Spherical water weight vessels are suspended from the opposite end of the levers, the water weight vessel of the lever 69 being indicated at 75 and that of the lever 69ª being indicated at 75ª. A flexible hose 76 leads from the valve 66 to the water weight vessel 75. A similar hose 76ª leads from the valve 66ª to the water weight vessel 75ª. A flexible hose 77 connects the upper portions of the vessels 50, 75, and a flexible hose 77ª connects the upper portions of the vessels 50ª, 75ª.

Valves 78, 78ª, are carried on supports 79 with which the discharge pipes 24, 24ª are provided. Each of said valves has a stem 80 which is provided at its outer end with a gear 81. Levers 82, 82ª, are respectively associated with the said valves, each of said levers having a weight 83 at one end, and also having a sector gear 84 which engages the gear 81. A water weight vessel 84 is carried and suspended from the opposite end of the lever 82, a similar water weight vessel 84ª being suspended from the opposite end of the lever 82ª. Stops 85 are provided to limit the extent of movement of the levers 82, 82ª. A flexible drain pipe 85' leads from the bottom of the weight vessel 55 to the valve 78, a corresponding flexible valve pipe 85ª leading from the bottom of the water weight vessel 55ª to the valve 78ª. A flexible overflow pipe 86 connects the weight vessel 55 with the water weight vessel 84ª. A similar flexible overflow pipe 86ª connects the water weight vessel 55ª with the water weight vessel 84. Valves 87, 87ª are respectively connected with the water weight vessels 50, 50ª by flexible drain pipes 88, 88ª. Each of the said valves has a stem 89 which is provided at the outer end with a gear 90. Levers 91, 91ª are respectively associated with the valves 87, 87ª, each of said levers having a sector gear 92 which engages the associated gear 90. (See Fig. 16). Water weight tanks 93, 93ª are respectively associated with and connected to the levers 91, 91ª. Each of said levers has at its outer end a weight 94. A lever 95 is also provided for each of said water weight tanks, said levers having weights 96 at their outer ends. Stops 97 limit the extent of movement of the levers 91, 91ª. Flexible drain pipes 98, 98ª, respectively connect the water weight vessels 75ª, 75 with the valves 87, 87ª, as shown in Fig. 1. Flexible drain pipes 99, 99ª, respectively connect the valves 78, 78ª with the water weight tanks 93, 93ª. A flexible pipe or hose 100 leads from the valve 87 and discharges into the tank 93. A similar pipe 101 leads from the valve 87ª and discharges into the tank 93ª. A flexible hose 102 leads from the tank 93 and is connected to a discharge union 103. A similar pipe 102ª connects the tank 93ª with a discharge union 103ª. A flexible drain pipe 104 connects the water weight vessel 84 with the discharge union 103, a similar pipe 104ª connecting the water weight vessel 84ª with the discharge union 103ª. Said discharge unions are respectively provided with valves 105, 105ª, each of which has a stem which is provided at the outer end with a gear 106. Levers 107, 107ª, are respectively associated with the valves 105, 105ª, each of said levers having a sector gear 108 which engages the associated gear 106. An overflow hose 109 leads from the upper side of the water weight vessel 84 and discharges into the tank 93, a corresponding overflow hose 109ª connecting the water weight vessel 84ª and the tank 93ª.

I will now describe the means for automatically operating the levers 107, 107ª, and causing said levers to operate the valves 105, 105ª.

Weights 110, 111, are associated with each of said levers. Each weight 110 is heavier than the companion weight 111 and is connected to one of the levers by a cord 112 which passes over a suitable direction pulley 113 which is mounted on the frame. Said weights are arranged at opposite sides of the levers and each weight 111 is connected to the lever with which it is associated by means of a cord 114 which passes over a pulley 115 which is similar to the pulley 113. Vertical guides 116, 117, are provided for the respective weights. A hanger 118 depends from the rack bar 8, a similar hanger 118ª depending from the rack bar 8ª. Each hanger is provided at the lower end with a horizontally arranged axially movable tappet arm 119. Said tappet arms are normally projected into the paths of the respective levers 107, 107ª, by springs 120, and each tappet arm is provided at the end opposite its lever engaging end with a detent arm 121. Arranged near the terminals of the path of movement of each lever is a fixed cam 122. Normally each of the said levers is held by its weight 110 in the position required to keep its associated valve closed. Hence the weights 111 are normally raised as shown in Figs. 1 and 18. When a lever is moved by its associated tappet arm in the required direction to cause the valve to which said lever is geared, to be opened, said tappet arm is then by the engagement of its detent member 121 with the associated cam 122, withdrawn, against the tension of the spring 120, from the path of said lever and thereupon the weight 110 returns the lever quickly to normal position thus again closing the valve. When the hanger which carries the tappet arm moves back, the spring 120, as the detent 121 disengages the cam 122, returns the tappet arm to normal projected position in the path of said lever and hence as said hanger nears the limit of its rearward movement, said tappet arm strikes and passes over the upper end of said lever as shown in detail in Fig. 24. Such movement of the lever is against the pull of the lighter weight 111 and immediately after the tappet passes over the lever in the rearward movement of the tappet, said weight 111 returns said lever to the normal required position, in front of the tappet 119, as indicated in Figs. 1, 18 and 23.

The frame which reciprocates with the piston is also provided with means for operating the levers 69, 69ª, as I will now describe.

On opposite sides of said frame are standards 123, each of which has a U-shaped bracket 124 at its upper end. In each bracket is pivoted, as at 125, a tappet 126 which has a cross bar 127 at its upper end and a weight 128 at its lower end. Said weight normally maintains said tappet in vertical position. The cam ends of the levers 74, 74ª are movable vertically into and out of the paths of the cross arms 127 of the tappets. Each bracket 124 is provided with stops 129, 130, which limit the extent of the pivotal movement of said levers, the levers when in vertical position engaging the stop 129, and when in inclined position engaging the stop 130. See Figs. 1, 6, 7 and 9. The stops of the respective brackets are arranged in reverse relation so that one tappet can tilt in one direction and the other tappet is enabled to tilt only in the reverse direction.

The operation of my improved hydraulic motor is as follows:—

Let it be assumed that the parts are in the position shown in Fig. 1, with the piston near the left hand end of its stroke, and that the link 39 has been manually disengaged from the retaining hook 40 to cause the weight 35 to move the lever 31 to the position shown in Fig. 3 and thus cause the gears 34, 30 to open the valve 28 in the feed pipe 17, as shown in detail in Fig. 4. The valve 66 is open to flexible hose 76 and the valve 66ª is closed to flexible hose 76ª, as shown in Fig. 5. The water or other motor fluid under pressure has therefore passed from the pipe 17 through said valve 66 and the flexible hose 76 into the water weight valve or vessel 75, filling such vessel and increasing its weight to such an extent as to cause the lever 69 to move in the required direction to cause the gears 68, 72 to turn said valve 66 to open passage to pipes 18 and 18ª. When the said vessel 75 overflows, the overflow water passes through the flexible hose 77 into and fills the water weight vessel 50. It will be understood that the valve 87ª is closed. As such vessel 50 fills, its increasing weight causes it to move the lever 46 in the required direction to cause the gears 44, 48 to close the air outlet valve 41, and said lever 46 being connected to the lever 59 by the link 61, as hereinbefore stated, said lever 59 is also moved in the required direction to cause the gears 27, 62 to close the water outlet valve 25. During this period the valve 87 is closed. The overflow water from the vessel 50 passes through the flexible hose 58 into the water weight vessel 55, filling the latter, and causing said water weight vessel 55 to be lowered and to hence turn the lever 23 in the required direction to cause the associated gears 21, 22 to open the valve 20, so that water passes from the pipe 17 through the branch 18 and valve 20 and tube 19 into the left hand end of the cylinder 1, and thereby causes the piston 2 to move to the right, as indicated by the arrow in said Fig. 1. Overflow water from the vessel 55 passes through the flexible hose 86 into the water weight vessel 84ª, causing said vessel 84ª to descend and to thereby turn the lever 82ª in the required direction to cause its associated gears to open the valve 78ª and thus cause the water weight vessel 55ª to be drained, the drainage water passing into the tank 93ª, and said water weight vessel 55ª being then raised by the action of the associated permanent weight 53 on the lever 23ª, said lever and associated gears closing the valve 20ª.

The water weight vessel 84ª being in lowered position the water drains therefrom also into the tank 93ª so that said tank becomes filled and descends to the position shown in Fig. 1, its downward movement, causing the lever 91ª and associated gears to open the valve 87ª and to thereby drain the water weight vessels 75 and 50ª, thus causing the air outlet valve 41ª and the water outlet valve 25ª to open, as will be understood.

The permanently weighted end of the lever 69 thereupon causes said lever to turn in the required direction to raise said water weight vessel 75 and to close the valve 66. As the piston moves, the frame 5 moves therewith and the rack 8, gear 12, ratchet wheel 13 and pawl 14, turn the power shaft 10 in the direction indicated by the arrow in Fig. 25, and the lever 107ª is moved by the means and in the manner hereinbefore described to cause the valve 105ª to be opened a sufficient length of time to drain the water from the water weight tank 93ª. Said tank is then raised by its associated weights and levers to initial position and the valve 105ª is closed by the reverse action of the lever 107ª which is imparted thereto by the weight 110 as before described.

While the tank 93ª is being drained, the filled water weight vessel 75ª descends, thus causing the lever 69ª and associated gears 68, 72, to open the valve 66ª. When said vessel 75ª overflows, the overflow water passes through the flexible hose 77ª into and fills the water weight vessel 50ª. As such vessel 50ª fills, its increasing weight causes it to move the lever 46ª in the required direction to cause the associated gears 44, 48 to close the air outlet valve 41ª, and said lever 46ª being connected to the lever 59ª by the link 61ª, as hereinbefore stated, said lever 59ª is also moved in the required direction to cause the associated gears 27, 62 to close the water outlet valve 25ª. During this period valve 87 is closed. The overflow water from the vessel 50ª passes through the flexible hose 58ª into the water weight vessel 55ª, filling the latter and causing said vessel 55ª to descend and to hence turn the lever 23ª in the required direction to cause the associated gears 21ª, 22ª to open the valve 20ª so that water passes from the pipe 17 through the branch 18ª, valve 20ª and tube 19ª into the right hand end of the cylinder 1 and thereby causes the piston to make a return stroke and move to the left, or in the opposite direction to that indicated by the arrow in Fig. 1. Overflow water from the vessel 55ª passes through the flexible hose 86ª into the water weight vessel 84, causing said vessel 84 to descend and to thereby turn the lever 82 in the required direction to cause its associated gears to open the valve 78 and thus cause the water weight vessel 55 to be drained, the drainage water passing into the tank 93 and said water weight vessel 55ª being then raised by the action of the associated permanent weight 53 on the lever 23, said lever and associated gears closing the valve 20.

The water weight vessel 84 being in lowered position, the water drains therefrom also into the tank 93, so that said tank becomes filled and descends, its downward movement causing the lever 91 and associated gears to open the valve 87 and to thereby drain the water weight vessels 75ª and 50ª, thus causing the air outlet valve 41 and the water outlet valve 24 to open, as will be understood.

The permanently weighted end of the lever 69ª therefore causes said lever to turn in the required direction to raise said water weight vessel 75 and to close the valve 66ª. Hence the piston is caused to make its reverse stroke, and the lever 107 is moved by the means and in the manner hereinbefore described, to cause the valve 105 to be opened a sufficient length of time to drain the water from the water weight tank 93. Said tank is then raised by its associated weights and levers to initial position and the valve 103 is closed by the reverse action of the lever 107, which is imparted thereto by its associated weight 110.

During the reverse stroke of the piston the rack 8ª, gear 12ª, ratchet wheel 13ª, and pawl 14ª, are active to also turn the power shaft 10 in the same direction, so that during the operation of the motor said power shaft is continuously driven, by step-by-step movement, but in one direction. Two or any desired number of the motors may be provided with a common power shaft 10, to deliver as much power as may be desired, and said motors may be so timed as to cause the power shaft to be revolved by a rapid succession of step-by-step movements, as will be understood. The motor may be employed for furnishing the power for machinery of any kind and for doing any desired work, or for operating pumps or other mechanism or apparatus. The tappets 126 which are carried by the frame 5 operate reversely and in succession, each tappet as the piston nears the end of its stroke, engaging under the cam and permanently weighted end of the lever 69 or lever 69ª as the case may be and turning said lever to a sufficient extent to open the valve 66 or the valve 66ª and thereby reverse the stroke of the piston, as will be understood. The valves 40 and 41 permit the escape from the cylinder 1 of such air as may be sucked in with the water and also prevents the possibility of the formation of a partial vacuum in the cylinder, behind the piston, as will be understood.

I would have it understood that my improved motor may be made of any suitable material and of any desired size and I would also have it understood that changes may be made in the form, proportion and construction of the several parts, without departing from the spirit of my invention and within the scope of the appended claims.

What I claim is:—

1. In a hydraulic motor, a cylinder, a piston therein, valves to control the admission of water to and its discharge from opposite ends of the cylinder and thereby cause the piston to move, and valve operating means including water weight vessels, means to normally raise said water weight vessels, and means to control the supply of water to and the discharge of water from said water weight vessels.

2. In a hydraulic motor, a cylinder, a piston therein, valves to control the admission of water to and its discharge from opposite ends of the cylinder and thereby cause the piston to move, and valve operating means controlled by the movements of the piston, and including water weight vessels, means to normally raise said water weight vessels, and means to control the supply of water to and the discharge of water from said water weight vessels.

3. In a hydraulic motor, a cylinder, a piston therein, valves to govern the admission to and discharge of water from the cylinder to cause the piston to move, valve operating means controlled by the movements of the piston and including water weight vessels, means to normally raise said vessels, means to cause said vessels to be successively supplied with water, and means to discharge water from said vessels.

4. In a hydraulic motor, a cylinder, a piston therein, valves to govern the admission to and discharge of water from the cylinder to cause the piston to move, valve operating means controlled by the movements of the piston and including water weight vessels, means to normally raise said vessels, means to cause said vessels to be successively supplied with water, one from another, and means to discharge water from said vessels.

5. In a hydraulic motor, a cylinder, a piston therein, valves to govern the admission to and discharge of water from the cylinder to cause the piston to move, valve operating means controlled by the movements of the piston and including water weight vessels, means to normally raise said vessels, means including flexible conduits between the vessels, to cause said vessels to be successively supplied with water, one from another, and means to discharge water from said vessels.

6. In a hydraulic motor, a cylinder, a piston therein, valves to directly govern the admission to and discharge of water from the cylinder to cause the piston to move, operating means for said valves including water weight vessels, and means to normally raise said vessels, primary valves, operating means therefor also including water weight vessels, and means to normally raise said vessels, flexible conduits between the water weight vessels of the primary valve operating means and the water weight operating means of the admission valves, flexible conduits between the water weight operating means of the admission valves and the water weight vessels of the discharge valve operating means, to cause said vessels to be successively supplied with water, one from another, means to discharge water from said vessels, means, controlled by the movements of the piston to alternately impart initial movement to said primary valves operating means, and means, also controlled by the movements of the piston to govern the operation of said water discharge means.

In witness whereof I affix my signature.

JOSÉ MA. CALLEJAS.